Patented Feb. 5, 1952

2,584,930

UNITED STATES PATENT OFFICE 2,584,930

OIL BASE DRILLING FLUID

Henry Shinouda, Cairo, Egypt, assignor to Shell Development Company, San Francisco, Calif., a corporation of Delaware No Drawing. Application November 28, 1949, Serial No. 129,875. In the Netherlands December 10, 1948

5 Claims. (Cl. 252—8.5)

This invention relates to the drilling of oil and gas wells and pertains more particularly to the use and composition of improved oil-containing drilling fluids.

Drilling fluids or muds are generally used when drilling wells by the rotary method. These muds are usually pumped down through the drill stem of the rotary rig and around the drill bit, returning to the surface through the annular passage between the drill stem and the well casing.

Prime requisites of a satisfactory drilling fluid are that it possess a good gel structure, preferably a substantially thixotropic gel structure and good plastering or sheath-forming characteristics. That is, it must form on the walls of the borehole a mudsheath effectively preventing any appreciable fluid loss to the formation. Any substantial loss of fluid to the formation is undesirable at any time during the drilling, being especially dangerous and objectionable when drilling through heaving formations such as shale, or when drilling into the producing zone, which may be contaminated and plugged by said fluid.

An oil base drilling fluid is commonly prepared by adding to a crude oil, or to oil fraction thereof, a small quantity of a plastering agent such as blown asphalt along with a weighting agent and a stabilizing agent. In some cases an emulsifying agent may be added together with water and the mixture emulsified to form either an oil-in-water or water-in-oil emulsion, as desired.

The suspending medium or component in oil base drilling fluids is generally a paraffin-base oil although occasionally a naphthene-base oil is used. Drilling fluids incorporating aromatic oils as the suspending medium have proved unsuitable in that they are less stable from a colloid-chemical point of view, that is, considerable settling out of the weighting material occurs.

It is a primary object of this invention to provide an improved oil-containing drilling fluid having excellent gel structure and plastering properties, wherein the suspending medium of said fluid comprises aromatic oils.

It is also an object of the present invention to provide an oil-containing drilling fluid possessing excellent plastering properties which does not contain an added asphalt, such as blown asphalt, as a plastering agent.

These and other objects of this invention will be understood from the following detailed description of the invention. The term "oil-containing drilling fluid" employed herein and in the appended claims, includes water-in-oil emulsions, oil-in-water emulsions wherein either the aqueous or the non-aqueous fluid component may vary in proportions from one to fifty per cent of the total fluid phase, and oil-base drilling fluids having a base substantially comprising an oil, although it may be noted that these so-called pure oil-base drilling fluids normally contain, after a relatively short period of drilling, an amount of emulsified or non-emulsified water, usually formation water, rain water, water from aqueous alkali additives, etc., equal to from one to several per cent of the total fluid phase.

The present invention can be practiced by adding a small quantity of a paraffin wax to a drilling fluid of the oil-base type or of the water-and-oil emulsion type in which the oil phase comprises an aromatic oil. The addition of small quantities of a paraffin wax to a drilling fluid containing aromatic oils yields a fluid that forms a thin, impervious mudsheath on the borehole walls. An outstanding advantage of the above aromatic oil-containing fluids is that they possess a substantially thixotropic gel structure and the weighting materials contained therein exhibit little tendency of settling out.

An especially outstanding class of paraffin waxes that tend to stabilize aromatic oil-containing drilling fluids and enhance the plastering properties thereof, are those waxes known as micro-crystalline paraffin waxes. These waxes normally contain a substantial portion of non-straight chain paraffin waxes, i. e., branched and/or cyclic chain paraffin waxes. While micro-crystalline waxes are the preferred type, it has been found that normal or straight-chain paraffin waxes may be used either alone or together with micro-crystalline waxes.

The paraffin waxes generally used according to the present invention are those waxes, or mixtures of waxes, whose average melting point is about 65° C. and above. Preferably a paraffin wax having a melting point of about 85° C. or more is employed, especially in drilling fluids to be used in well boreholes whose temperatures are close to that figure. While, in normal drilling operations, the temperature of a drilling fluid does not become as great as that of the borehole due to the circulation of the fluid, it is preferred that the melting point of the paraffin wax in such fluid be great enough so that it exceeds the well temperature at all times. Under such conditions there would be no tendency for the wax in the drilling fluid to melt.

The term "aromatic oil" employed herein and in the appended claims, includes substantially all asphalt-base crudes which in general contain considerable amount of aromatics, all fractions of the above crudes that still contain high percentages of aromatics, and all crudes to which substantial proportion of aromatic compounds have been added. Thus, while a preferred aromatic oil comprises an asphalt base oil high in aromatics, an aromatic oil may also be made from paraffin base oil to which has been added an aromatic extract. This aromatic extract may be obtained, for example, by a phenol or furfural extraction on a distillate cut (or residue therefrom) of a crude oil. It is understood that the term "aromatics" includes all high molecular weight polynuclear aromatic hydrocarbons which may or may not have attached to them side chains that are aliphatic.

In general it may be said that the more paraffin wax is suspended in an aromatic oil, the better the plastering properties will be of a drilling fluid containing the oil and wax. At the same time, the viscosity of a drilling fluid may rise to an undesirable value when excessive amounts of wax are employed. The amount of wax to be added to an aromatic oil in order to obtain the desired plastering properties depends both upon the type of wax used and upon the percentage of aromatics in the oil. The percentages of aromatics in different asphalt base crudes vary to such an extent that it is not possible to state with any degree of accuracy the amount of wax that should be added when using a crude to make a drilling fluid according to the present invention.

Most drilling fluids made with aromatic oils may be said to have satisfactory plastering properties when 10% of a micro-crystalline paraffin wax has been added thereto. On the other hand any aromatic-oil drilling fluids with good plastering properties may be prepared having only 5 per cent wax added; others with 20 per cent or more wax added. It is realized that the waxes of the present invention may also impart desirable properties to oil-containing drilling fluids when added in amounts as small as one per cent.

Drilling fluids may also contain a suspended component, a plastering agent and a stabilizing and/or emulsifying agent. A plastering agent such as blown or polymerized asphalt is commonly incorporated in an oil-containing drilling fluid to seal the porous walls of the well borehole by forming a sheath of mud thereon. According to the present invention, no blown asphalt need normally be added when a paraffin wax is added to an aromatic oil; however up to 20% blown asphalt by weight of the oil phase may be added to certain oils in addition to the paraffin wax if a substantially total elimination of fluid loss is desired.

A suspended component in the form of a weighting material is generally added to drilling fluids in order to improve plastering properties and to add weight to the drilling fluid. Weighting materials commonly used are clay, crushed oyster shells, barites, hematite, magnetite, etc. However, for the purposes of the present invention it is preferred to use finely ground or powdered weighting materials which have a greater tendency to be wetted by oil than by water, e. g. the weighting material may constitute a substantial portion by weight of the drilling emulsion, e. g., in the range of 20 to 60 per cent. In the case of drilling emulsions, 0.5 to 5% of a suitable emulsifying agent is also used, e. g., soaps of fatty acids, rosin acids, tall oil and the like. In general, excellent emulsions may be obtained with most of these soaps when about 1 per cent (by weight) of the emulsifier is used.

By way of example, oil-containing drilling fluids were prepared by mixing 100 parts by weight of an aromatic oil such as mineral oil from the Sambodja or Seria fields with 10 parts by weight of a micro-crystalline paraffin wax and 30 parts by weight of ground shells. These fluids had very good plastering properties and substantially no fluid loss to the formation.

In the event that large amounts of weighting materials are added to the present drilling fluid while the fluid is being used in a relatively high temperature well, any bottom settling may be obviated by the addition of small amounts (0.5 to 4.0%) of a soft soap. A soft soap suitable for this purpose may be a rosin or resin soap, tall oil soap, "floating" tall oil soap or a fatty acid soap. The alkali metal soaps are preferred.

I claim as my invention:

1. An oil-containing drilling fluid for wells, comprising a substantial quantity of an aromatic mineral oil, a finely divided weighting material dispersed in said fluid, and from 1 to 20% by weight of the oil of a micro-crystalline paraffin wax suspended in said oil.

2. An oil-containing drilling fluid for wells, comprising a substantial quantity of an aromatic mineral oil, a finely divided weighting material dispersed in said fluid, and from 1 to 20% by weight of the oil of a micro-crystalline paraffin wax suspended in said oil.

3. An oil-containing drilling fluid for wells, comprising a substantial quantity of an aromatic mineral oil, a finely divided weighting material dispersed in said fluid, and from 1 to 20% by weight of the oil of a micro-crystalline paraffin wax having an average melting point of at least 65° C.

4. An oil-base drilling fluid for wells consisting essentially of a predominant quantity of an aromatic mineral oil containing a substantial amount of aromatic hydrocarbons, a finely divided solid material dispersed in said fluid, and from 1 to 20% by weight of the oil of micro-crystalline paraffin waxes having an average melting point of at least 65° C.

5. An oil-base drilling fluid for wells, comprising an aromatic mineral oil, a finely divided solid weighting material dispersed in said oil, and from 1 to 20% by weight of the oil of a micro-crystalline paraffin wax suspended in said oil.

HENRY SHINOUDA.

REFERENCES CITED

The following references are of record in the file of this patent:

UNITED STATES PATENTS

| Number | Name | Date |
| --- | --- | --- |
| 1,053,720 | Feigensohn | Feb. 18, 1913 |
| 1,455,010 | Swan | May 15, 1923 |
| 2,126,096 | Deguide | Aug. 9, 1938 |
| 2,214,263 | Weihe | Sept. 10, 1940 |
| 2,497,398 | Dawson | Feb. 14, 1950 |
| 2,509,588 | Dawson | May 30, 1950 |